United States Patent
Finnilä et al.

(10) Patent No.: US 12,148,133 B2
(45) Date of Patent: Nov. 19, 2024

(54) METHOD AND DEVICE FOR IMAGE PROCESSING, AND STORAGE MEDIUM

(71) Applicant: BEIJING XIAOMI MOBILE SOFTWARE CO., LTD, Beijing (CN)

(72) Inventors: Tapio Finnilä, Tampere (FI); Murat Birinci, Tampere (FI); Petteri Kyrönlahti, Tampere (FI); Uygar Tuna, Tampere (FI); Ali Karaoglu, Tampere (FI)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 354 days.

(21) Appl. No.: 17/700,312

(22) Filed: Mar. 21, 2022

(65) Prior Publication Data
US 2022/0318967 A1    Oct. 6, 2022

(30) Foreign Application Priority Data
Mar. 30, 2021   (EP) .................................. 21166005

(51) Int. Cl.
*G06T 5/92*    (2024.01)

(52) U.S. Cl.
CPC ...... *G06T 5/92* (2024.01); *G06T 2207/20208* (2013.01)

(58) Field of Classification Search
CPC ... G06T 5/92; G06T 2207/20208; G06T 5/94; G06T 2207/10024; G06T 2207/20021; G06T 3/4007; G06T 7/90; G06T 5/90
See application file for complete search history.

(56) References Cited

U.S. PATENT DOCUMENTS

| | | |
|---|---|---|
| 2015/0221280 A1 | 8/2015 | Van Der Vleuten |
| 2016/0360171 A1 | 12/2016 | Tao et al. |
| 2016/0360172 A1 | 12/2016 | Tao et al. |
| 2016/0360173 A1 | 12/2016 | Tao et al. |
| 2016/0360174 A1 | 12/2016 | Tao et al. |
| 2021/0360178 A1* | 11/2021 | Min .................. H04N 25/57 |

FOREIGN PATENT DOCUMENTS

| | | | |
|---|---|---|---|
| CN | 106162131 | * | 4/2015 |
| CN | 106530263 | * | 10/2016 |
| CN | 107113470 A | | 8/2017 |

(Continued)

OTHER PUBLICATIONS

Machine translation for CN 106162131 (Year: 2015).*

(Continued)

*Primary Examiner* — Qian Yang
(74) *Attorney, Agent, or Firm* — Arch & Lake LLP

(57) ABSTRACT

A method and device for image processing, and storage medium are provided. In the method, an initial image I is acquired; a set of m predetermined tone-mapping functions is provided; a pixel I(i) of the initial image is selected; a pixel weight w(i) for the selected pixel I(i) is determined based on pixel information of at least the selected pixel; for each tone-mapping function, a tone-mapping function weight is determined based on the pixel weight; each tone-mapping function is applied to the selected pixel I(i) and weighting the result with the respective tone-mapping function weight; the sum of the weighted result as final pixel I'(i) is determined.

19 Claims, 5 Drawing Sheets

(56) References Cited

FOREIGN PATENT DOCUMENTS

| CN | 111292269 A | 6/2020 |
|---|---|---|
| EP | 3913573 A1 | 11/2021 |

OTHER PUBLICATIONS

Machine translation for CN 106530263 (Year: 2016).*
Sohsuke Shimoyama et al:"Local adaptive tone mapping with composite multiple gamma functions", Image Processing (ICIP), 2009 16th IEEE International Conference on IEEE Piscataway NJ USA Nov. 7, 2009 (Nov. 7, 2009), pp. 3153-3156, XP031629082, ISBN: 978-1-4244-5653-6, (4p).
Supplementary European Search Report in the European Application No. 21166005.5, mailed on Sep. 16, 2021, (9p).
Nazneen A, "Camera Tuning: Understanding the Image Signal Processor and ISP Tuning", Mar. 2, 2020, (5p).
Eilertsen, G. et al., "A comparative review of tone-mapping algorithms for high dynamic range video", 2017, (28p).
Paris, S. et al., "Local Laplacian Filters: Edge-aware Image Processing with a Laplacian Pyramid", https://sci-hub.se/10.1145/1964921.1964963, (11p).
"Tone Mapping Explained" https://www.youtube.com/watch?v=bQoddOkkaAQ, Oct. 11, 2017, (4p).
"Tone Mapping" Further articles could be reached via google scholar: https://scholar.google.com/scholar?hl=fi&as_sdt=0%2C5&q=tone+mapping&btnG =. (2p).
"How to use Dual Exposure on Google Pixel" https://www.youtube.com/watch?v=A_0yp_1WkWY, Oct. 17, 2020, (8p).
First Office Action of the Chinese application No. 202210224595.3 dated May 16, 2024 with English translation, (14p).

* cited by examiner

METHOD AND DEVICE FOR IMAGE PROCESSING, AND STORAGE MEDIUM

CROSS-REFERENCE TO RELATED APPLICATION

This application is based upon and claims the priority of European Patent Application No. EP21166005.5, filed on Mar. 30, 2021, the content of which is incorporated herein by reference in its entirety for all purposes.

BACKGROUND

Photography has become more and more popular. Simultaneously, the demands on the quality of the images are increasing. Therein, information captured with a camera chip, such as a CMOS or the like, is further processed in order to acquire the final image. One important step of this processing is tone-mapping.

SUMMARY

The present disclosure relates to a method and device for image processing, and storage medium.

In an aspect of the present disclosure a method for image processing is provided, comprising the steps of: a) acquiring an initial image I; b) providing a set of m predetermined tone-mapping functions; c) selecting a pixel I(i) of the initial image; d) determining a pixel weight w(i) for the selected pixel I(i) based on pixel information of at least the selected pixel; e) determining for each tone-mapping function a tone-mapping function weight based on the pixel weight w(i); and f) applying each tone-mapping function to the selected pixel I(i) and weighting the result with the respective tone-mapping function weight; g) determining the sum of the weighted result as final pixel I' (i).

In a further aspect of the present disclosure a device is provided comprising an image sensor and a processor, wherein the processor is configured to perform operations of: a) acquiring an initial image I; b) providing a set of m predetermined tone-mapping functions; c) selecting a pixel I(i) of the initial image; d) determining a pixel weight w(i) for the selected pixel I(i) based on pixel information of the selected pixel; e) determining a tone-mapping function weight for each tone-mapping function based on the pixel weight; f) applying each tone-mapping function to the selected pixel I(i) and weighting the result with the respective tone-mapping function weight; and g) determining the sum of the weighted result as a final pixel I'(i).

In a further aspect, there is provided a non-transitory computer-readable storage medium having stored thereon computer-executable instructions that when executed by a processor, cause the processor to perform a method for image processing, the method including: a) acquiring an initial image I; b) providing a set of m predetermined tone-mapping functions; c) selecting a pixel I(i) of the initial image; d) determining a pixel weight w(i) for the selected pixel I(i) based on pixel information of the selected pixel; e) determining a tone-mapping function weight for each tone-mapping function based on the pixel weight; f) applying each tone-mapping function to the selected pixel I(i) and weighting the result with the respective tone-mapping function weight; and g) determining the sum of the weighted result as a final pixel I'(i).

It is to be understood that the above general descriptions and detailed descriptions below are only explanatory and not intended to limit the disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION

Figure 1:
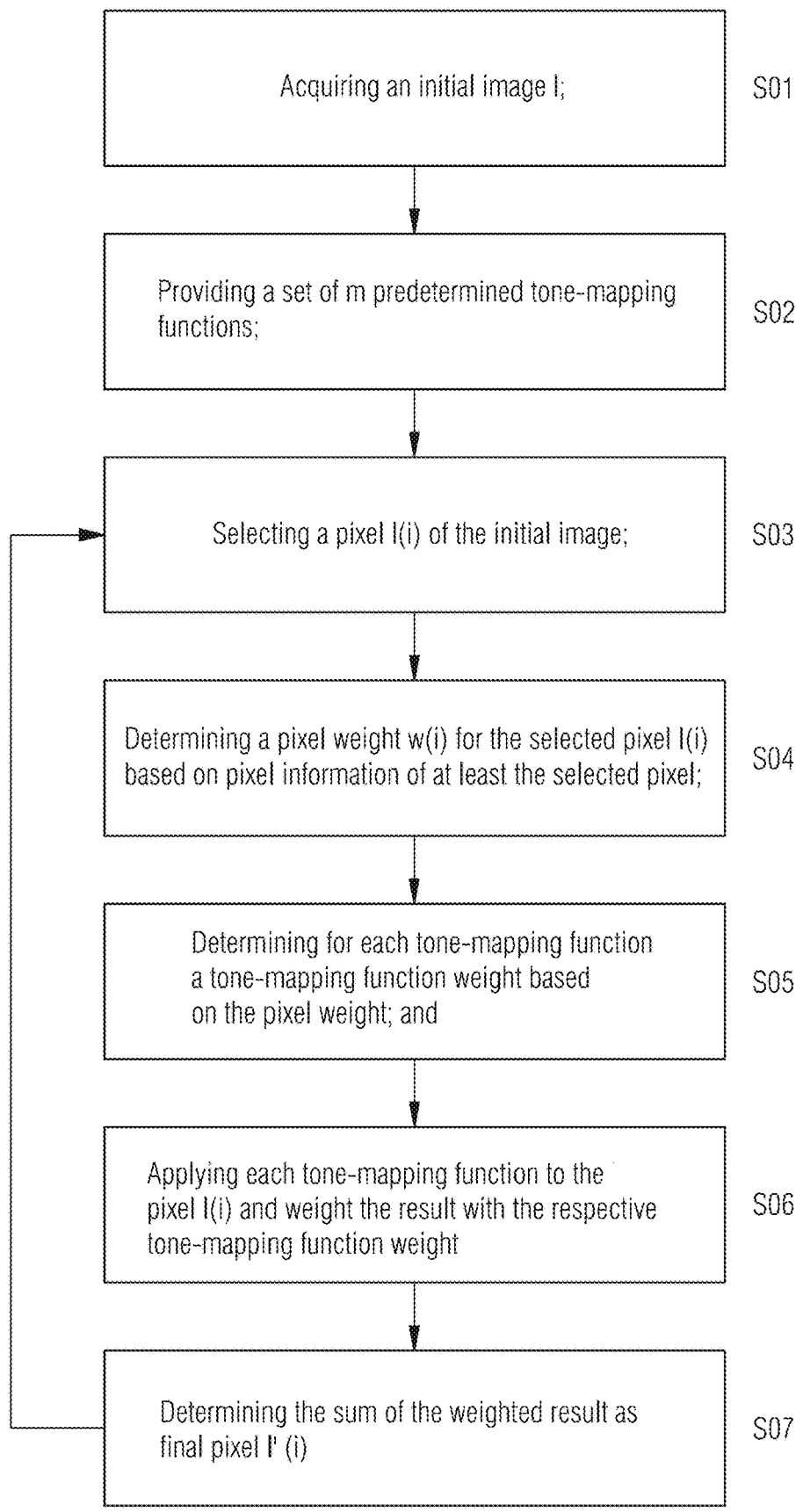
FIG. 1 is a flow diagram of the method according to at least one example of the present disclosure.

Reference will now be described in detail to examples, which are illustrated in the accompanying drawings. The following description refers to the accompanying drawings in which the same numbers in different drawings represent the same or similar elements unless otherwise represented. The examples described following do not represent all examples consistent with the present disclosure. Instead, they are merely examples of devices and methods consistent with aspects of the disclosure as detailed in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

Tone-mapping is the process of mapping the image pixels representing relatively higher dynamic range to a viewing environment (i.e. displaying media) with relatively lower dynamic range. While doing this, tone-mapping process is responsible to provide images to be represented as close as possible to the real-world scene. Tone-mapping includes both brightness and contrast enhancement sub-algorithms to generate subjectively pleasing images. Tone-mapping algorithms can be targeted for a sole algorithm (e.g. as a post-processing algorithm) or can be implemented as a part of the image processing pipeline also known as Image Signal Processor (ISP) pipeline. The ISP may be implemented in software, firmware, hardware or in a dedicated processor. The ISP can also be implemented in simulation environment which may be used to develop the algorithms for the algorithms being developed for end-user devices.

Common global and local tone-mapping algorithms rely on the decomposition of the image into multiple-layers and enhancement of each layer independently before collapsing them back into the image. Laplacian pyramid based local tone-mapping algorithm (TM) is one of this kind of algorithms which is regarded as the state-of-the-art algorithm such as known from S. Paris, S. W. Hasinoff, J. Kautz, Local Laplacian Filters: "Edge-aware Image Processing with a Laplacian Pyramid". These multi-scale image-based tone-mapping algorithms are not favourable in the industry because of the high line-buffer cost (i.e. large footprint in the hardware) or memory costs for offline processing. Therefore, instead of multi-layer decomposition-based tone-mapping algorithms, in the industry, grid-based local tone-mapping algorithms are used. Therein, the image is mapped onto a grid wherein each node of the grid provides a parameter of a certain area of the image. However, the grid-based tone-mapping algorithms suffer from the large number of parameters required for the algorithm. This increases the bandwidth cost, which is not favoured in the real time applications. A further drawback of the grid-based solutions is that, depending on the interpolation algorithm used, they might produce halos in the high contrast edges. These halos may be avoided if more advanced interpolation methods are used. However, advanced interpolation methods require additional line buffers, thus increasing the hardware implementation cost.

Referring to FIG. 1, showing a flow diagram of the method for image processing, in particular for tone mapping.

In step S01 an initial image I is acquired for example by an image sensor of a camera device or a mobile terminal comprising a camera.

In step S02, a set of m predetermined tone-mapping functions is provided. Therein, the number of predetermined tone-mapping functions is equal to or larger than 2. In particular, m is selected to be equal to or larger than 2 and smaller than or equal to 20 (2≤m≤20) and more in an example, smaller than or equal to 10 (2≤m≤10). In an example, the number of predetermined tone-mapping functions is equal to or larger than 2 and equal to or smaller than the number of nodes of the weight grid as described in more detail below.

In step S03, a pixel I(i) of the initial image is selected.

In step S04, a pixel weight w(i) for the selected pixel I(i) is determined based on pixel information of at least the selected pixel. Therein, the pixel information might include color information and/or luminance. For example, when using the Lab color space, the pixel information might encompass the L-channel, the a-channel or the b-channel or a combination thereof. In an example, the pixel weight w(i) is determined on the basis of the luminance as described in more detail below. Therein, in an example, a weight grid is calculated using the pixel information of the selected pixel, wherein the weight grid is used for calculation of the pixel weight w(i) as described below.

In step S05, for each tone-mapping function a tone-mapping function weight is determined based on the pixel weight.

In step S06, each tone-mapping function is applied to the selected pixel I(i) and weighting the result with the respective tone-mapping function weight. Thus, first a tone-mapped pixel $I_{LUT_k}(i)$ is determined for each tone-mapping function of the set of predetermined tone-mapping functions with k=1, . . . , m. Thus, m results of the tone-mapped selected pixel are acquired. Afterwards, each tone-mapped pixel $I_{LUT_k}(i)$ is then weighted by the respective tone-mapping function weight $w_k(i)$ by multiplying $I_{LUT_k}(i) \times w_k(i)$ to acquire a weighted tone-mapped pixel $\tilde{I}_k(i)$.

In step S07, the sum of the weighted result is determined as final pixel I'(i) by $\Sigma_{k=1, \ldots, m} \tilde{I}_k(i)$.

Hence, a set of a certain number m of predetermined tone-mapping functions is used. It is not necessary to specifically implement or tune the respective tone-mapping functions individually for each pixel or a group of pixels. Thus, the number of parameters necessary for applying the tone-mapping is reduced, improving the required bandwidth without loss of image quality or degradation of the appearance of the final image.

Figure 2B:
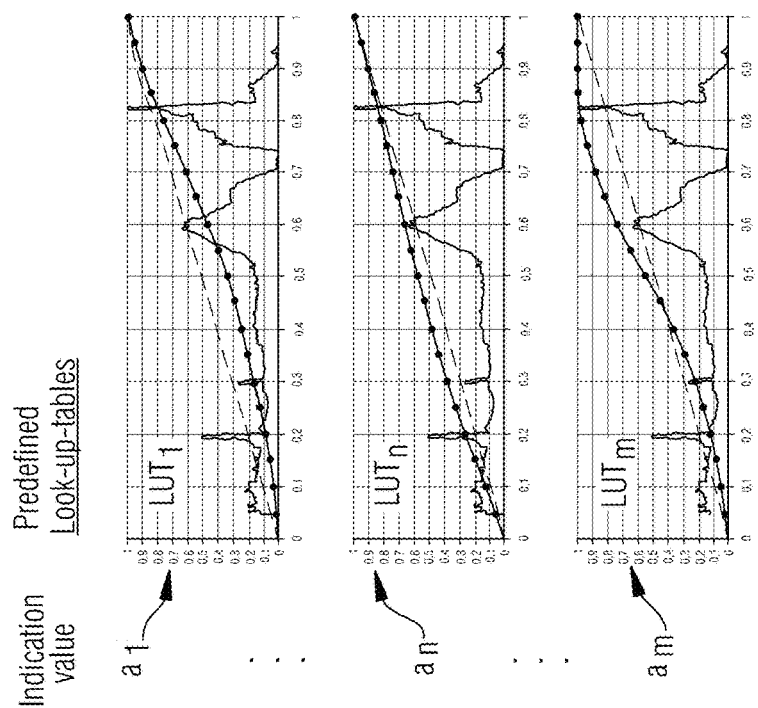
FIG. 2B shows an example of a set of predetermined tone-mapping functions.
Figure 2A:
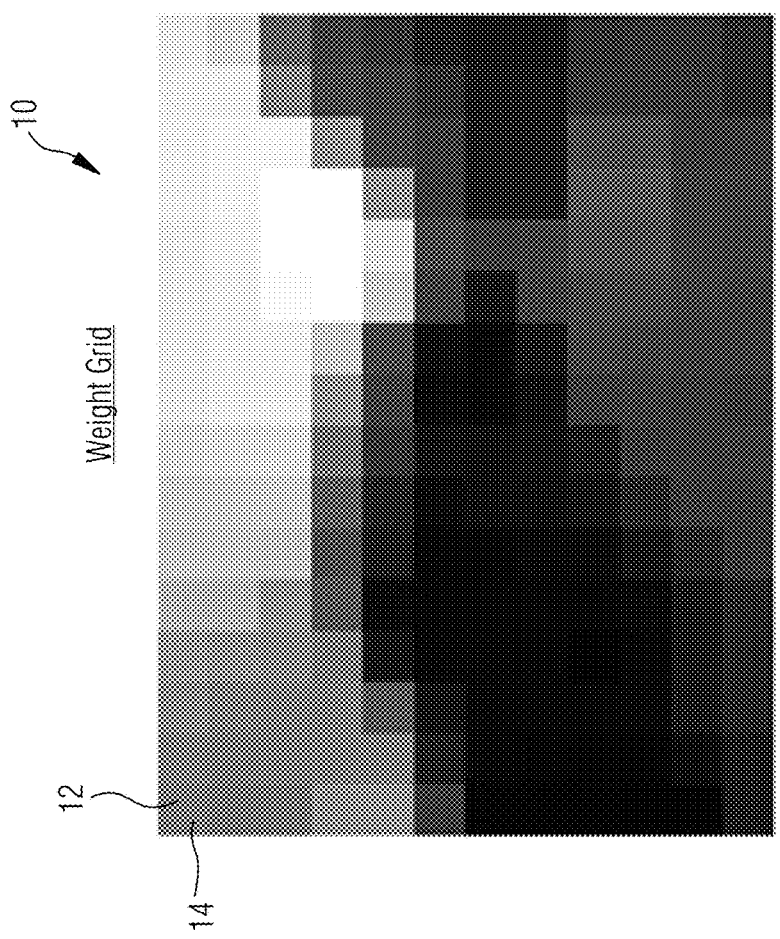
FIG. 2A shows an example of a weight grid.

Referring to FIG. 2A, showing a weight grid 10 with a plurality of grid nodes 12, wherein for each pixel I(i) a weight can be assigned according to its position in the weight grid 10. For example, pixel 14 shown in FIG. 2A is assigned to the grid node 12 in the left upper corner. Thus, the pixel weight of the exemplified pixel 14 might be provided by the grid node 12 or can be calculated on the basis of a node value assigned to the respective grid node 12.

Therein, the weight grid 10 can be calculated by interpolation based on pixel information in the area covered by the respective weight grid node 12 or by the pixel information of the pixels assigned to the respective grid node 12. Interpolation can be done by averaging the pixel information and using this average as the pixel weight for all pixels assigned to the respective grid node 12. Therein, the pixel information relates to the colour channel information and/or the luminance. For example, when using the Lab colour space, the weight grid 10 is determined on the basis of one or more of the L-channel, a-channel, or/and the b-channel. Other possibilities than averaging the pixel information to calculate the weight grid 10 could be implemented and might comprise for example machine learning algorithms, and the like. However, the present disclosure is not limited to a specific way to determine the weight grid 10. The determination (construction, creating) of the weight grid 10 could be done both in the hardware and software, i.e. implemented as learning based algorithms in the software.

Further, the pixel weight can be obtained by interpolation on the basis of the values assigned to the neighbouring nodes and/or the pixel information of neighbouring pixels of the selected pixel. Therein, interpolation can be done in various ways such as by using a bilinear, bicubic or even more advanced interpolation algorithms such as bilateral interpolation algorithms. Depending on the employed interpolation method, additional information may be used to support the per pixel weight grid interpolation. For instance, for bilateral interpolation, a downscaled (i.e. low-resolution) representation of the input image might be used for better guidance during the interpolation.

Further, the number of grid nodes 12 can be selected and is in the present example selected to be a grid with 12×16 grid nodes 12. Selection of the number of nodes 12 can be done by a present number being fixed for several initial images, on the basis of the initial image, for example related to the contrast change in the image, or might be set by the user. Therein, for a large number of nodes 12, the present method applies a local adaption of the respective area of the initial image, while with a low number of nodes 12 a global adaption is applied. To each grid node 12, a grid node value which is for example between [0,1] might be assigned. Thus, upon selecting a certain pixel I(i) of the initial image I indicated by the pixel index i, a pixel weight w(i) can be determined based on the weight grid 10, wherein the weight grid 10 provides a weight for the selected pixel according to the pixel information of at least the selected pixel and for example by the pixels belonging to the same grid node 12.

Referring to FIG. 2B, a set of m predetermined tone-mapping functions are provided for example implemented as look-up tables (LUT). Therein, according to FIG. 2B, the respective tone-mapping functions are indicated by LUT1 to LUTm. The number of predetermined tone-mapping functions is preset and at least larger than 2. In an example, the number of predetermined tone-mapping functions is between 2 and 20, and in an example the number of predetermined tone-mapping functions is between 2 and 10. In an example, the number of preset tone-mapping functions is larger than 2 and less than or equal to the number of nodes 12 of the weight grid 10. Therein, each tone-mapping function is associated with an indication value a1 to am providing an association information between the respective tone-mapping functions and the respective weight values of the weight grid 10. If the values of the weight grid 10 are limited to [0,1], also the indication values are limited to these values. In particular, the indication value is related to a luminance value. Therein, the indication value might be distributed between a minimum indication value and a maximum indication value, wherein the minimum indication value and/or the maximum indication value is selected according to one of:

A minimum luminance value or maximum luminance value of the initial image;

An absolute minimum luminance value usually indicated by a value zero or an absolute maximum luminance value usually indicated by a value 1; or A preset minimum luminance value or a preset maximum luminance value.

Figure 3:
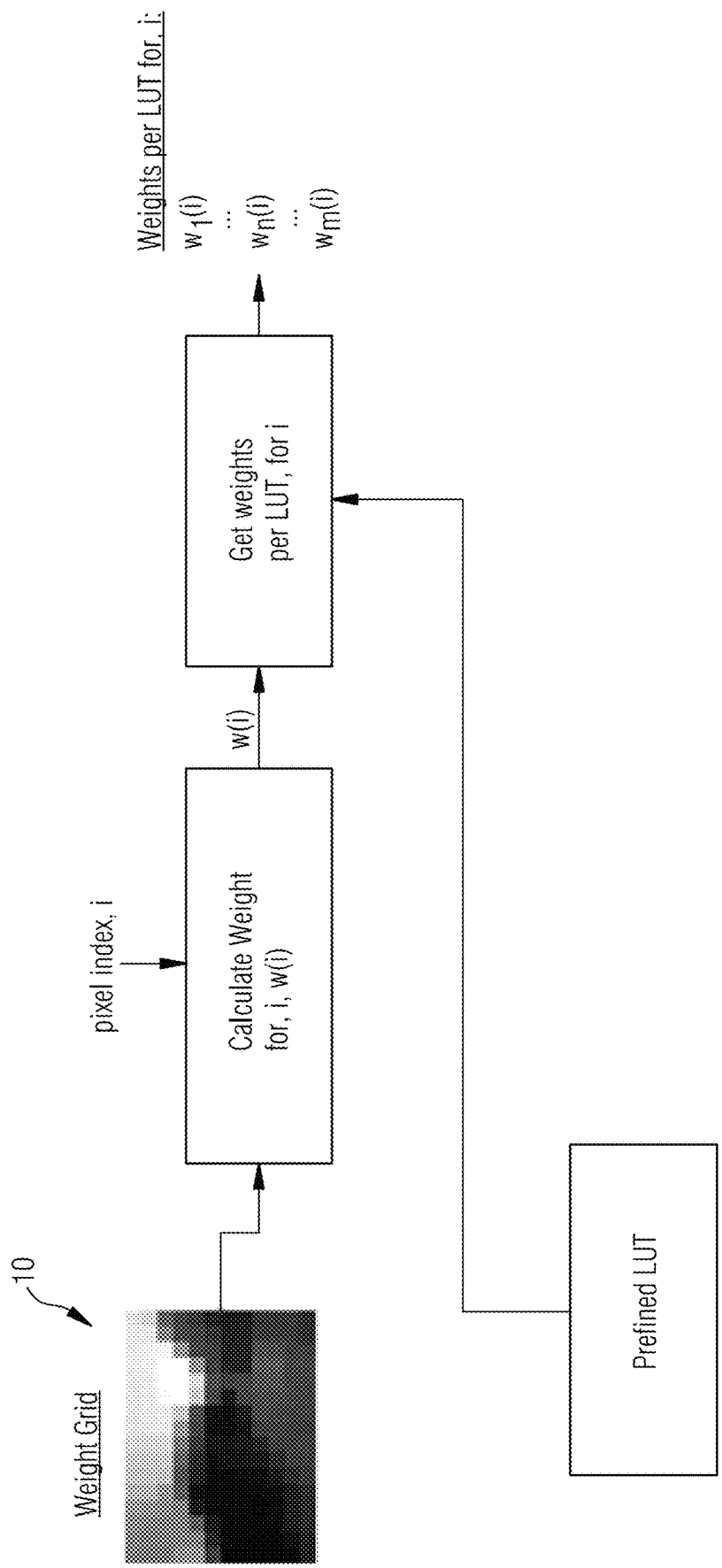
FIG. 3 is a diagram for calculating the tone-mapping function weights according to at least one example of the present disclosure.

Referring to FIG. 3, according to step S05, for each tone-mapping function a respective tone-mapping function weight $w_1(i)$ to $w_m(i)$ is determined. Starting with the weight grid 10, a pixel weight w(i) for the selected pixel I(i) is calculated. Afterwards, on the basis of the pixel weight w(i) the individual tone-mapping function weights are calculated for each of the tone-mapping functions The algorithm starts by calculating the weight for the given pixel index, i, for example by interpolating the relevant weight grid nodes 12. This interpolation can be done in various ways such as by using a bilinear, bicubic or even more advanced interpolation algorithms such as bilateral interpolation algorithms.

For a given pixel index with the calculated pixel weight w(i) and the nodes information, tone-mapping function weights per LUT are calculated, i.e. $w_1(i), \ldots, w_n(i), \ldots, w_m(i)$. The indication value carries the association of each LUT to the interpolated weight for the image index, i. Each tone-mapping function weight can then be calculated using any interpolation algorithm using any distance information such as absolute distance, squared distance, or any combination of such. The interpolation can also be performed between the nearest selected (2 or few) nodes 12. For example, for $LUT_k$ and for image index i, the weight, $w_k(i)$, can be calculated by using a squared distance based as follows:

$$w_k(i) = \frac{\sum_{k=1:m}(w(i)-a_k)^2}{(w(i)-a_k)^2},$$

where $a_k$ is the indication value for each LUT.

In order to make sure that $w_1(i), \ldots, w_m(i), \ldots, w_n(i)$ are between [0,1], the weights can be further normalized by:

$$w_k(i) = \frac{w_k(i)}{\sum_{k=1:m} w(i)}$$

The calculated tone-mapping function weights are then passed to the next step and used in the fusion of the outputs of the LUTs.

Figure 4:
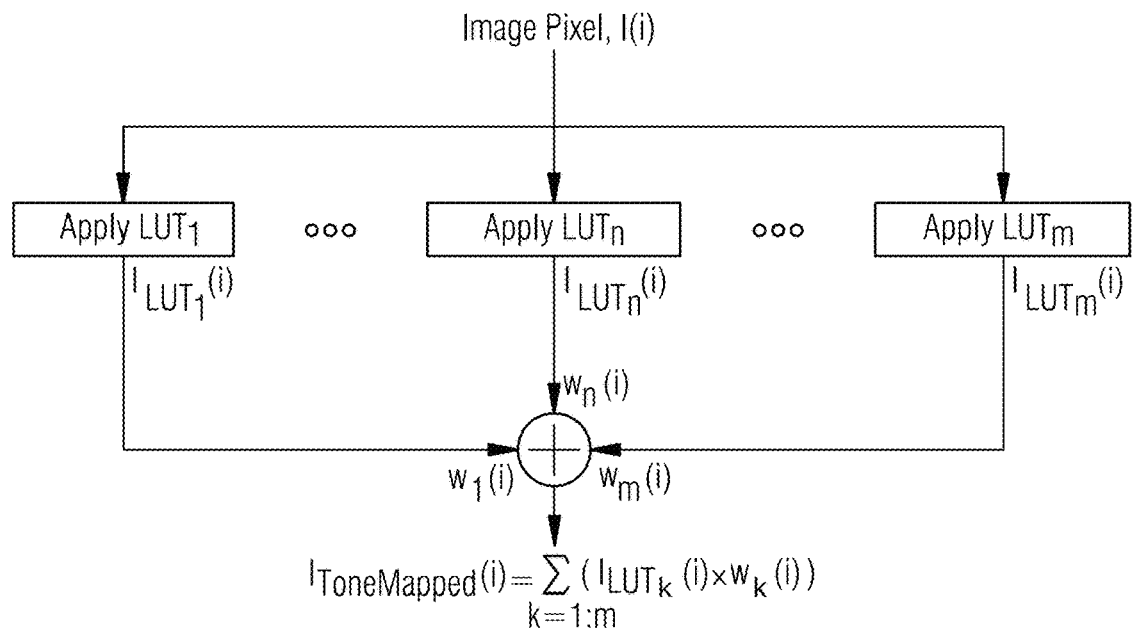
FIG. 4 is a diagram for calculating a final pixel.

Referring to FIG. 4, showing application of the LUTs and calculate a respectively tone-mapped pixel. In this step, first each of the LUTs is applied to the selected image pixel, I(i), to determine the outputs, $I_{LUT_1}(i), \ldots, I_{LUT_n}(i), \ldots, I_{LUT_m}(i)$. Then, by using the tone-mapping function weights, $w_1(i), \ldots, w_n(i), \ldots, w_m(i)$, calculated before, the final tone-mapped pixel, $I_{ToneMapped}(i)$ (or I'(i)) is determined by the weighted sum over all tone-mapped selected pixels $I_{LUT_1}(i), \ldots, I_{LUT_n}(i), \ldots, I_{LUT_m}(i)$ being weighted by the respective tone-mapping function weights $w_1(i), \ldots, w_n(i), \ldots, w_m(i)$. In other terms $$I_{ToneMapped}(i) = \sum_{k=1:m} I_{LUT_k}(i) \times w_k(i).$$

These steps are repeated for each pixel of the initial image in order to form the final image being properly tone-mapped.

The present disclosure provides an efficient and effective local tone-mapping method (both brightness and contrast enhancement). Since this invention does not require any line buffers, it is possible to be implemented efficiently by hardware. The amount of parameter sets is not as large as other grid-based tone-mapping algorithms typically used in the industry. Therefore, it requires smaller bandwidth. Further, the method is fully scalable between local and global operations. When the number m of predetermined tone-mapping functions is reduced and/or the provided LUTs get more alike (like each other), the algorithm starts operating more in global manner. When the LUTs differ from each other and/or the number m is increased, the process becomes more locally oriented.

Figures 5A, 5B, 5C:
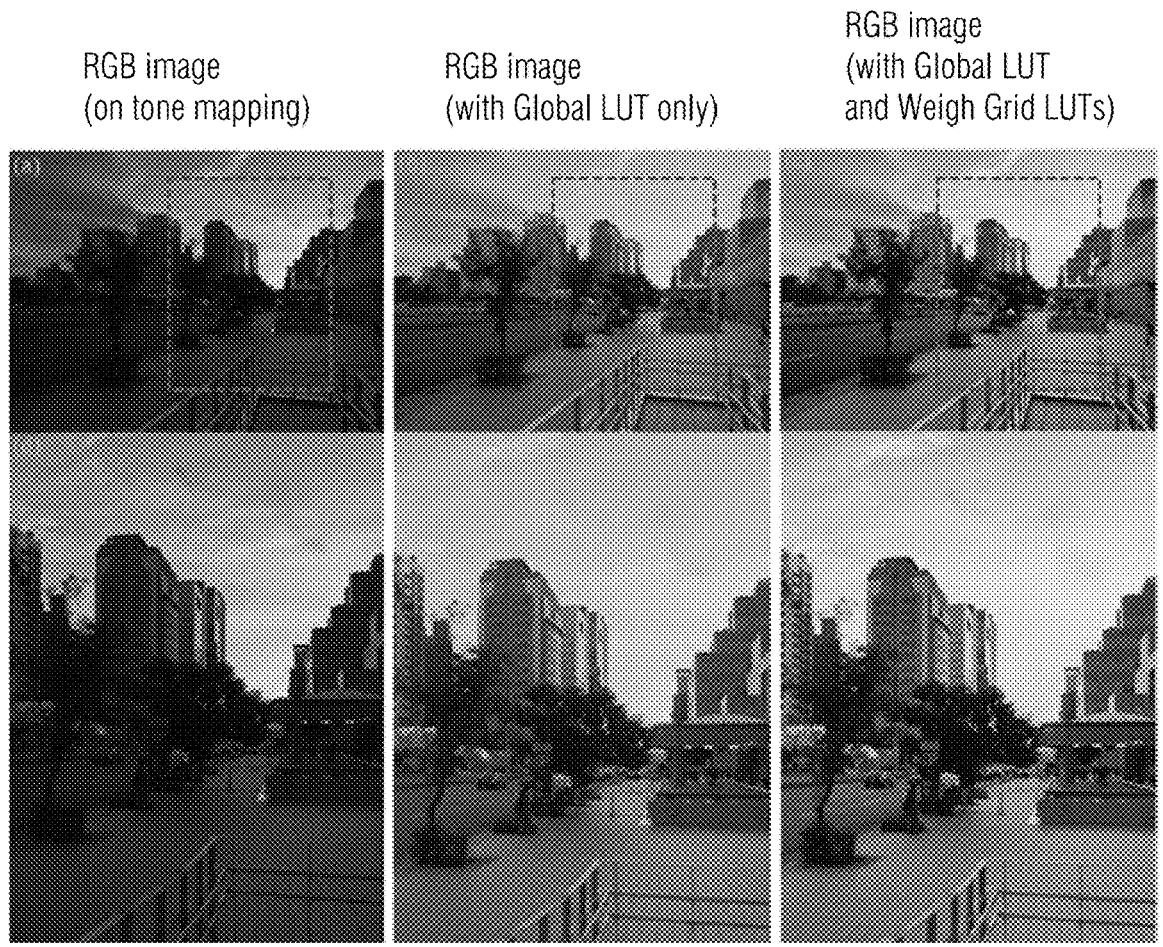
FIGS. 5A-5C show a comparison of at least one example of the present disclosure.

Referring to FIGS. 5A-5C, providing an example generated with the present disclosure. Especially in high-dynamic range (HDR) scenes, in addition to the global operations, the local tone-mapping and contrast optimization operations are crucial to generate pleasing images. In FIGS. 5A-5C, an HDR image processed without tone-mapping (FIG. 5A), with only global LUT (FIG. 5B) and with both global and local operations (done by the method of the present disclosure) (FIG. 5C). As seen from the right-most column, the local operations are especially responsible for bringing the local details (see the contrast in the clouds in the sky, in the trees and buildings). These local details cannot be enhanced by using global operations.

Figure 6:
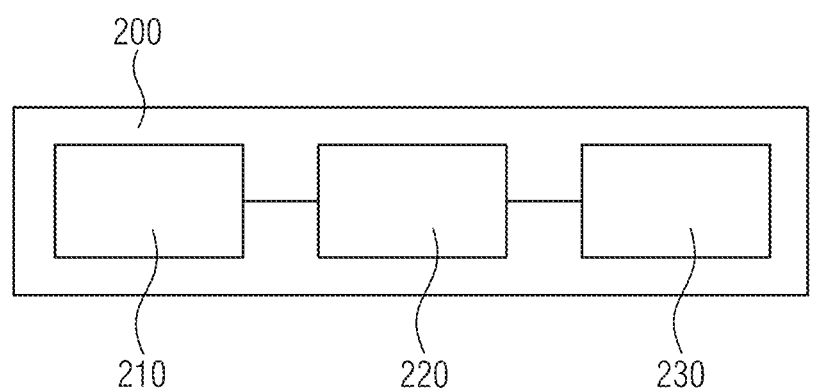
FIG. 6 shows a device according to at least one example of the present disclosure.

Referring to FIG. 6, showing a device such as a terminal device 200 including a camera sensor or image sensor 220 which is connected to a processor 240. Further, the processor 240 is connected to a memory storage 260. The memory storage 260 might store instructions to be performed by the processor 240 to transform the raw image data captured by the image sensor 220 and providing the final image to a user of the terminal device 200. Therein, the processor 240 and memory 260 can be implemented as dedicated image processor implementing the ISP in hardware or can implement the ISP in software stored in the storage memory 260 processed by the processor 240.

What is claimed is:

1. A method for image processing, comprising:
a) acquiring an initial image I;
b) providing a set of m predetermined tone-mapping functions;
c) selecting a pixel I(i) of the initial image;
d) determining a pixel weight w(i) for the selected pixel I(i) based on pixel information of the selected pixel;
e) determining a tone-mapping function weight for each tone-mapping function based on the pixel weight;
f) applying each tone-mapping function to the selected pixel I(i) to receive a result and weighting the result with the respective tone-mapping function weight to receive a weighted result; and
g) determining a sum of the weighted result as a final pixel I'(i);
wherein each tone-mapping function is associated with an indication value, and the indication value is a luminance value; and
wherein the tone-mapping function weight is calculated based on the difference between the indication value and the pixel weight.

2. The method according to claim 1, wherein steps c) to g) are repeated for each pixel of the initial image.

3. The method according to claim 1, wherein the tone-mapping functions are implemented as look-up table (LUT).

4. The method according to claim 1, wherein the pixel weight is determined based on pixel information of the selected pixel and a plurality of adjacent pixels being adjacent to the selected pixel.

5. The method according to claim 1, wherein the pixel weight is based on the luminance as pixel information.

6. The method according to claim 1, wherein the indication value is distributed between a minimum indication value and a maximum indication value, and at least one of the minimum indication value or the maximum indication value is selected according to one of:
a minimum luminance value or maximum luminance value of the initial image;
an absolute minimum luminance value or an absolute maximum luminance value; or
a preset minimum luminance value or a preset maximum luminance value.

7. The method according to claim 1, wherein the tone-mapping function weights $w_k$, k=1, . . . , m, are calculated according to $$w_k(i) = \frac{\sum_{k=1:m}(w(i) - a_k)^2}{(w(i) - a_k)^2},$$

wherein w(i) denotes the pixel weight and $a_k$ denotes the indication value.

8. The method according to claim 1, wherein the tone-mapping function weights are normalized by $$w_k(i) = \frac{w_k(i)}{\sum_{k=1;m} w(i)}.$$

9. The method according to claim 1, wherein the indication value indicates association information between the tone-mapping function and the pixel weight.

10. A device, comprising an image sensor and a processor, wherein the processor is configured to perform operations of:
a) acquiring an initial image I;
b) providing a set of m predetermined tone-mapping functions;
c) selecting a pixel I(i) of the initial image;
d) determining a pixel weight w(i) for the selected pixel I(i) based on pixel information of the selected pixel;
e) determining a tone-mapping function weight for each tone-mapping function based on the pixel weight;
f) applying each tone-mapping function to the selected pixel I(i) to receive a result and weighting the result with the respective tone-mapping function weight to receive a weighted result; and
g) determining a sum of the weighted result as a final pixel I'(i);
wherein each tone-mapping function is associated with an indication value, and the indication value is a luminance value; and
wherein the tone-mapping function weight is calculated based on the difference between the indication value and the pixel weight.

11. The device according to claim 10, wherein the processor is configured to perform the operations c) to g) are repeated for each pixel of the initial image.

12. The device according to claim 10, wherein the tone-mapping functions are implemented as look-up table (LUT).

13. The device according to claim 10, wherein the pixel weight is determined based on pixel information of the selected pixel and a plurality of adjacent pixels being adjacent to the selected pixel.

14. The device according to claim 10, wherein the pixel weight is based on the luminance as pixel information.

15. The device according to claim 10, wherein the indication value is distributed between a minimum indication value and a maximum indication value, and at least one of the minimum indication value or the maximum indication value is selected according to one of:
a minimum luminance value or maximum luminance value of the initial image;
an absolute minimum luminance value or an absolute maximum luminance value; or
a preset minimum luminance value or a preset maximum luminance value.

16. The device according to claim 10, wherein the tone-mapping function weights $w_k$, k=1, . . . , m, are calculated according to $$w_k(i) = \frac{\sum_{k=1:m}(w(i) - a_k)^2}{(w(i) - a_k)^2},$$

wherein w(i) denotes the pixel weight and $a_k$ denotes the indication value.

17. The device according to claim 10, wherein the indication value indicates association information between the tone-mapping function and the pixel weight.

18. A non-transitory computer-readable storage medium having stored thereon computer-executable instructions that when executed by a processor, cause the processor to perform a method for image processing, the method comprising:
- a) acquiring an initial image I;
- b) providing a set of m predetermined tone-mapping functions;
- c) selecting a pixel I(i) of the initial image;
- d) determining a pixel weight w(i) for the selected pixel I(i) based on pixel information of the selected pixel;
- e) determining a tone-mapping function weight for each tone-mapping function based on the pixel weight;
- f) applying each tone-mapping function to the selected pixel I(i) to receive a result and weighting the result with the respective tone-mapping function weight to receive a weighted result; and
- g) determining a sum of the weighted result as a final pixel I'(i);

wherein each tone-mapping function is associated with an indication value, and the indication value is a luminance value; and wherein the tone-mapping function weight is calculated based on the difference between the indication value and the pixel weight.

19. The non-transitory computer-readable storage medium according to claim 18, wherein the indication value indicates association information between the tone-mapping function and the pixel weight.

\* \* \* \* \*